United States Patent Office 3,386,611
Patented June 4, 1968

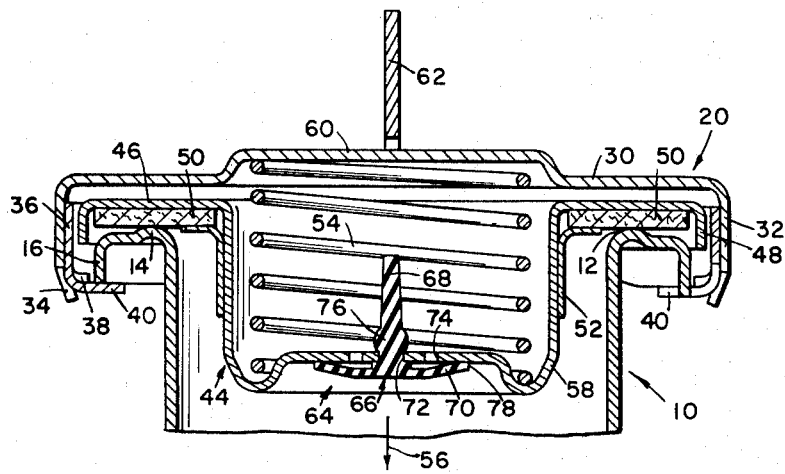

3,386,611
VENT-CONTROLLING GAS CAP
Billy G. Crute, Connersville, Ind., assignor to Stant
Manufacturing Company, Inc., Connersville, Ind.,
a corporation of Indiana
Filed May 31, 1967, Ser. No. 642,549
5 Claims. (Cl. 220—40)

ABSTRACT OF THE DISCLOSURE

A cap for closing a tank of the type provided with a filler neck having a mouth, a peripherally extending lip surrounding the mouth and, at the axially inner rim of the lip, cam-type locking elements defining conventional stop positions and safety positions. The cap comprises a generally discoid cap body which carries lugs for engaging the locking elements, a member which carries a gasket for sealably engaging the lip about the mouth of the filler neck, and a spring for urging the gasket-carrying member toward the mouth of the filler neck. The spring is calibrated so that, when the lugs are in the stop positions and a first predetermined pressure in the tank is exceeded, vapors can escape over the lip, and when the lugs are in the safety positions and a second predetermined pressure in the tank is exceeded, vapors can still escape over the lip, the first predetermined pressure being greater than the second predetermined pressure. In a preferred embodiment, the cap further comprises a valve arranged to admit air to the tank when the pressure in the tank drops below a predetermined level.

---

The present invention relates to vent-controlling gas caps, and more particularly to the provision of a gas cap which is arranged to permit the escape of pressure which is built up in the tank before the cap is removed and which is also arranged to permit the inhalation of air when the pressure in the tank drops below a predetermined level.

Heretofore, the fuel tanks of automotive vehicles have been provided with vent means to permit the escape of pressure which is built up by the normal vapor pressure of the fuel contained therein, by the change in temperature of the fuel contained in the tank and by diurnal phases which cause expansion and contraction of the fuel in the tank. Some fuel tanks have conventionally been provided with vent means, intended to be permanently open, built into their roofs, such vent means almost invariably including a length of small-diameter tubing leading to a point relatively remote from the tank. In other instances, valved cap have been provided for closing fuel tanks, which valved caps have included valve means for permitting the escape of vapors when the pressure in the tank is above a predetermined level and the inhalation of vapors when the pressure in the tank drops below a predetermined level.

The automotive industry is now concerned with vapor leakage in connection with the "anti-smog" or "clean-air" legislation being proposed in many states and, even, on a natioanl basis. Thus, the automotive industry is working toward the development of closed fuel systems or fuel systems which inhibit the escape of vapors. That is, it is the intent of these proposed closed fuel systems to trap the fuel vapors and to use them in the engine.

It will be apparent, therefore, that, if the gas tank is not vented and a considerable pressure is developed in the tank and if a conventional gas cap is removed in a conventional manner, the force of the pressure in the tank may cause fuel to gush out. Obviously, such a possibility presents a hazard to filling station operators and others who remove gas caps.

The primary object of my invention, therefore, is to provide a gas cap which may be backed off to a safety position in which further movement of the cap will be resisted and in which the pressure in the tank will be dissipated safely and without guishing.

Another object of my invention is to provide such a cap further comprising valve means arranged to permit the inhalation of air when the pressure in the tank drops below a predetermined level.

A further object of my invention is to provide such a cap for closing a tank of the type provided with a filler neck having a mouth, a peripherally extending lip surrounding the mouth and, at the axially inner rim of the lip, cam-type locking elements defining conventional stop positions and safety positions, the cap being provided with lugs for engaging the locking elements.

It will be apparent that the gas cap of the present invention is arranged so that, when the cap is in a full-on position, vapors may escape from the tank only when the pressure in the tank exceeds a predetermined maximum level and, when the cap is backed off to the safety position, vapors may escape from the tank when the pressure in the tank is greater than the atmospheric pressure. The cap of my invention is in the full-on position when the lugs carried by the cap are in the stop positions on the locking elements.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:
FIG. 1 is a sectional view showing a gas cap embodying my invention in its full-on position on a filler neck;
FIG. 2 is a sectional view showing the gas cap in its safety position on the filler neck;
FIG. 3 is a fragmentary view showing the profile of the cam-type locking elements of the filler neck;
FIG. 4 is a fragmentary, perspective view of a member which is carried internally of the outer cap body, which member is formed to provide radially inwardly extending lugs which engage the locking elements of the filler neck and a radially inwardly extending flange which provides a stop for the gasket-carrying member of the cap; and
FIG. 5 is a fragmentary, perspective view showing a cut-out in the outer cap body, which cut-out receives the lug formed on the member shown in FIG. 4.

Referring more particularly to the drawings, it will be seen that I have illustrated a cylindrical filler neck, indicated generally by the reference number 10, having a mouth 12, a peripherally-extending lip 14 surrounding the mouth 12 and providing an annular seat and, at the outer rim of the seat, a depending skirt 16 formed to provide a pair of cam surfaces 17 inclining away from the mouth 12 as they progress peripherally in one direction about the axis of the filler neck 10.

The lip 14 is provided with a pair of diametrically opposed notches 18, only one of which is seen in FIG. 3, which provide access openings for the lugs carried by the cap, indicated generally by the reference number 20, which closes the filler neck 10.

Referring to FIG. 3, it will be seen that each of the cam surfaces 17 formed on the skirt 16 defines a safety position or notch 22 and a stop position 24, the stop position 24 being the point on the cam surface 17 which is axially most remote from the mouth 12 of the filler neck 10. An abutment 26 is provided adjacent each stop position 24 to limit the movement of a lug, which is engaged with the cam surface 17, in the direction of the arrow 28.

The cap 20 comprises a discoid cap body 30 having a depending, peripheral skirt 32 which is turned in at its lowermost edge as indicated by the refernce number 34. An annular member 36 having a radially inwardly extending flange 38 and a pair of radially inwardly extending lugs 40 formed thereon is pressed into the cap body 30 as shown in FIGS. 1, 2 and 5, the in-turned portion 34 of the skirt 32 being provided with cutouts 42 (FIG. 5) for receiving the lugs 40.

The cap 20 further comprises a cup-shaped member 44 having a radially outwardly, peripherally extending flange 46 disposed concentrically above the lip 14 and, at the outer rim of the flange 46, a peripherally extending skirt 48 arranged to engage the top surface of the radially inwardly extending flange 38, thereby to limit the movement of the cup-shaped member 44 away from the cap body 30.

An annular gasket 50 is secured to the underneath side of the flange 46 by an annular bracket 52 as shown in FIGS. 1 and 2, the gasket 50 being provided sealably to engage the seat provided by the lip 14. The bracket 52 is spot welded or otherwise securely fastened to the body of the cup-shaped member 44. The gasket 50 may be fabricated from conventional gasket materials which are normally used in fuel systems and which are sufficiently resilient to provide a seal about the mouth 12 of the filler neck 10.

I have provided a coiled spring 54 for urging the cup-shaped member 44 in the direction of the arrow 56 and away from the cap body 30. As seen in FIGS. 1 and 2, the spring 54 is retained in the cup portion 58 of the cup-shaped member 44 and by a raised portion 60 of the cap body 30.

Preferably, an upturned flange 62 is welded or otherwise securely fastened to the cap body 30 to provide means for manually rotating the cap body 30 relative to the filler neck 10.

I have also provided one-way valve means, indicated generally by the reference number 64, arranged to permit the inhalation of air into the tank in communication with the filler neck 10 when the pressure in the tank drops below a predetermined level.

The illustrative valve means 64 comprises an elastomeric member 66 having a stem portion 68 and a circular flange portion 70, the stem portion 68 extending through an opening 72 in the bottom of the cup-shaped member 44 and the flange portion 70 being arranged to close a plurality of vent holes 74 which are also provided in the bottom of the cup-shaped member 44. The stem portion 68 is provided with an enlarged portion 76 which prevents movement of the stem portion 68 in the direction of the arrow 56. The flange 70 is arranged sealably to engage the bottom of the cup-shaped member 44 about the circumference 78 which circumscribes the openings 74. Preferably, the valve means 64 is arranged so that, when the pressure in the tank drops below the atmospheric pressure, the flange 70 will deflect to admit air through the openings 74 into the tank.

The cap 20 is placed over the filler neck 10 and positioned so that the lugs 40 can move through the notches 18 to engage the cam surfaces 17 formed on the skirt 16. When a lug 40 is first admitted through a notch 18, as suggested by the dashed-line drawing of the lug 40 in FIG. 3, the lug is prevented from moving in a direction opposite to the arrow 28 by an abutment 80. When the lug 40 is first moved in the direction of the arrow 28, it engages a protrusion 82 under which it must move before it reaches the safety position 22 which corresponds to the positions of the lugs 40 shown in FIG. 2. From the safety position 22, the lug 40 is moved in the direction of the arrow 28 to the stop position 24 which corresponds to the position of the lugs 40 shown in FIG. 1.

When the cap 20 is in the safety position shown in FIG. 2, the spring 54 is preferably relaxed so that, if the pressure in the tank is greater than the atmospheric pressure, vapors can escape over the lip 14. When the cap 20 is in the full-on position shown in FIG. 1, the spring 54 is compressed so that a pressure greater than the atmospheric pressure can be developed in the tank. That is, when the cap 20 is in the position shown in FIG. 1, the gasket 50 is urged against the lip 14 by the spring 54 with sufficient pressure to withstand a build up of pressure in the tank of, for instance, two pounds per square inch greater than atmospheric pressure. Thus, the cap 20 operates as a safety valve when the pressure in the tank exceeds a predetermined level.

Of course, the spring 54 urges the lugs 40 upwardly against the cam surfaces formed on the skirt 16, thereby to provide the desired resistance to rotation of the cap 20. When the lugs 40 are rotated away from their respective stop positions 24, the lugs will have a natural tendency to stop in the safety positions 22, thereby to permit the dissipation of any excessive pressure in the tank before the cap is fully removed from the filler neck, thus inhibiting gushing of liquid fuel through the filler neck.

What is claimed is:

1. A cap for closing a tank of the type including a filler neck having a mouth, a peripherally-extending lip surrounding said mouth and providing an annular seat and, at the axially inner rim of said lip, a cam surface inclining away from said mouth as it progresses peripherally in one direction, said cam surface defining a safety position at the beginning of its incline and a stop position at the end of its incline, said seat being provided with an access opening adjacent the beginning of said cam surface, said cap comprising a generally discoid cap body having a perimetral, depending skirt, a radially inwardly extending flange carried by said skirt and a lug carried by said skirt, said lug being movable through said access opening to engage said cam surface, a cup-shaped member having a radially outwardly, peripherally extending flange concentrically disposed above said annular seat and, at the outer rim of said radially outwardly extending flange, a peripherally extending inner skirt arranged to engage the top surface of said radially inwardly extending flange carried by said first mentioned skirt, thereby to limit the movement of said cup-shaped member away from said cap body, a spring disposed between said cap body and said cup-shaped member to urge said cup-shaped member away from said cap body, said spring being retained within the cup portion of said cup-shaped member, and an annular gasket concentrically carried on the underneath side of said radially outwardly extending flange, said gasket being provided sealably to engage said annular seat, said spring being calibrated so that, when said lug is in said stop position and a first predetermined pressure in said tank is exceeded, vapors can escape over said seat and so that, when said lug is in said safety position and a second predetermined pressure in said tank is exceeded, vapors can escape over said seat, said first predetermined pressure being greater than said second predetermined pressure.

2. A cap as in claim 1 further comprising a one-way valve arranged to admit vapor to said tank when the pressure in said tank drops below a predetermined level, said one-way valve being arranged to permit communication between the interior of said cup-shaped member and said tank.

3. A cap as in claim 2 wherein said one-way valve comprises an elastomeric member arranged resiliently to engage the bottom of said cup-shaped member, said bottom being provided with a hole covered by said member.

4. A cap as in claim 1 in which said radially inwardly extending flange and said lug are formed upon a separate annulus fixedly received within said first-mentioned skirt.

5. A closure cap comprising a generally discoid cap body having a perimetral, depending skirt, a separate annulus fixedly received within said skirt and formed to provide radially inwardly extending flange means at a level axially spaced from said body and to provide radially inwardly extending lug means at a level more remotely axially spaced from said body, a cup-shaped member having a radially outwardly, peripherally extending flange disposed between said body and said flange means and having a skirt turned toward said flange means and registering therewith, thereby to limit the movement of said cup-shaped member away from said body, spring means confined between said body and said cup-shaped member to urge said cup-shaped member away from said body, and annular gasket means carried by that surface of said flange remote from said cap body.

References Cited
UNITED STATES PATENTS

| 2,649,986 | 8/1953 | Konchan | 220—44 |
| 2,649,987 | 8/1953 | Konchan | 220—44 |

JAMES B. MARBERT, *Primary Examiner*.